April 21, 1959

L. A. ROYER 2,882,842

INCINERATOR

Filed June 22, 1954

Lloyd Alexander Royer
INVENTOR.

BY *Clarence A. O'Brien*
*and Harvey B. Jacobson*
Attorneys

April 21, 1959 L. A. ROYER 2,882,842
INCINERATOR
Filed June 22, 1954 2 Sheets-Sheet 2

Lloyd Alexander Royer
INVENTOR.

United States Patent Office 2,882,842
Patented Apr. 21, 1959

2,882,842

INCINERATOR

Lloyd Alexander Royer, Annville, Pa.

Application June 22, 1954, Serial No. 438,394

2 Claims. (Cl. 110—18)

This invention relates to an incinerator and more specifically provides improved construction of a portable incinerator.

An object of this invention is to provide an incinerator having a mobile supporting frame, together with a pivotally mounted housing having a portion for burning of inflammable trash and a portion for storing unburnable trash together with means for dumping the ashes and the unburnable trash when desired.

Another object of this invention is to provide an incinerator mounted on a mobile frame that may be attached to a suitable pulling vehicle wherein the incinerator may be pulled to several desired locations for picking up trash and then pulled to the desired area for dumping.

Still another object of this invention is to provide an incinerator in the form of a trailer for an automotive vehicle or the like wherein means is provided for tilting the incinerator thereby dumping the trash and ashes from a pivotal closure at the rear end thereof.

A still further object of the present invention is to provide an incinerator of the portable type that is simple in construction, easy and efficient in operation, versatile in utility, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
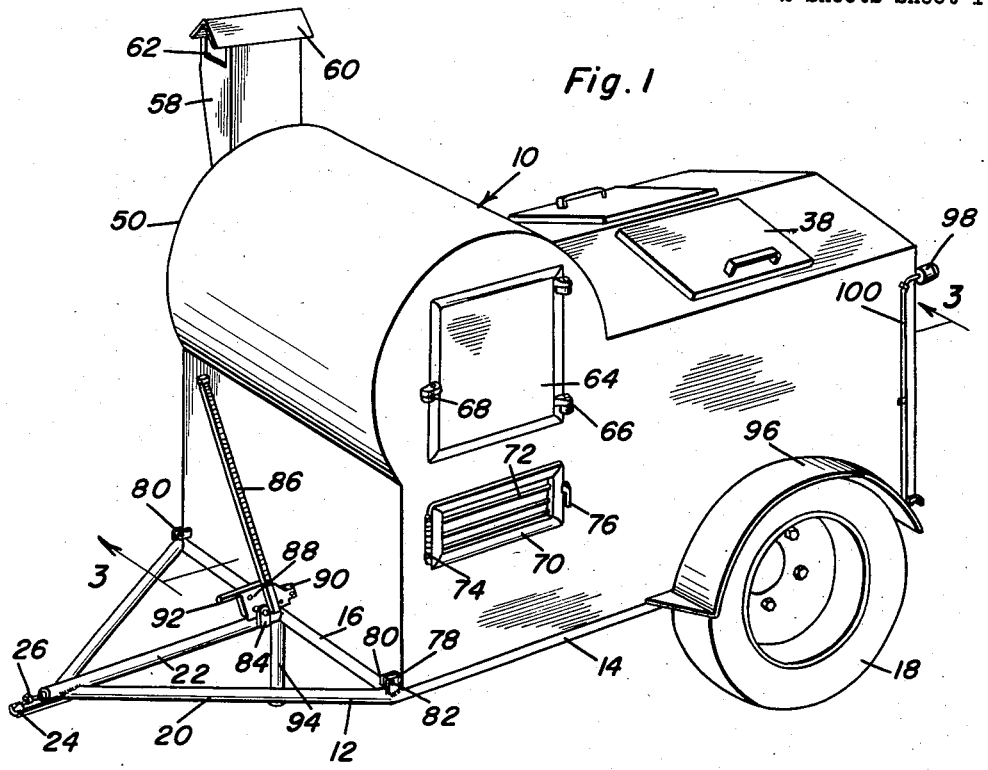
Figure 1 is a perspective view of the incinerator of the present invention.
Figure 2 is a rear end elevational view showing the details of the pivotal closure door and other structural relationship of the device.
Figure 3:
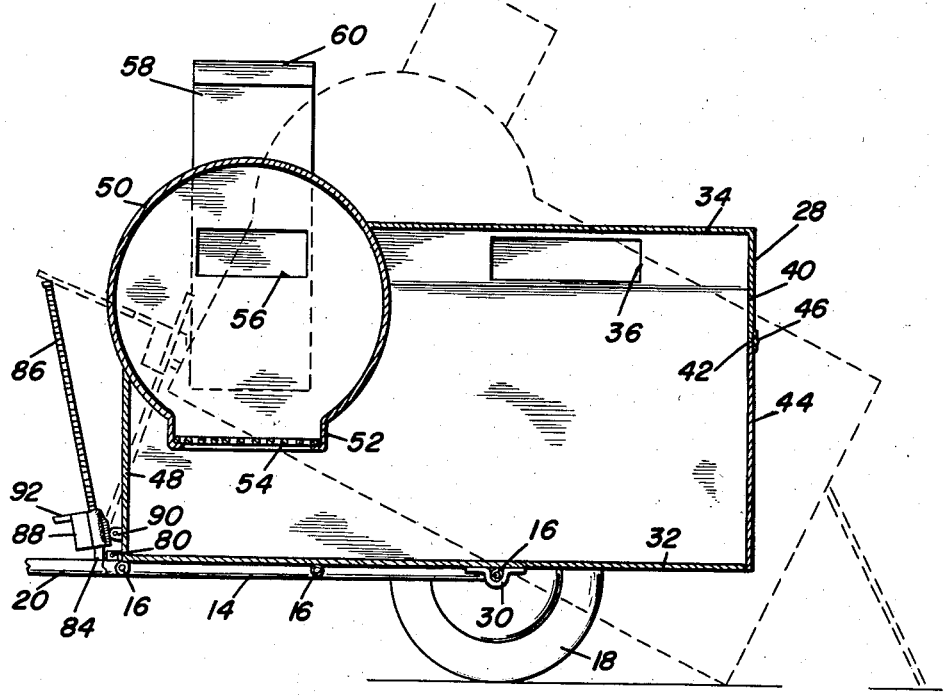
Figure 4:
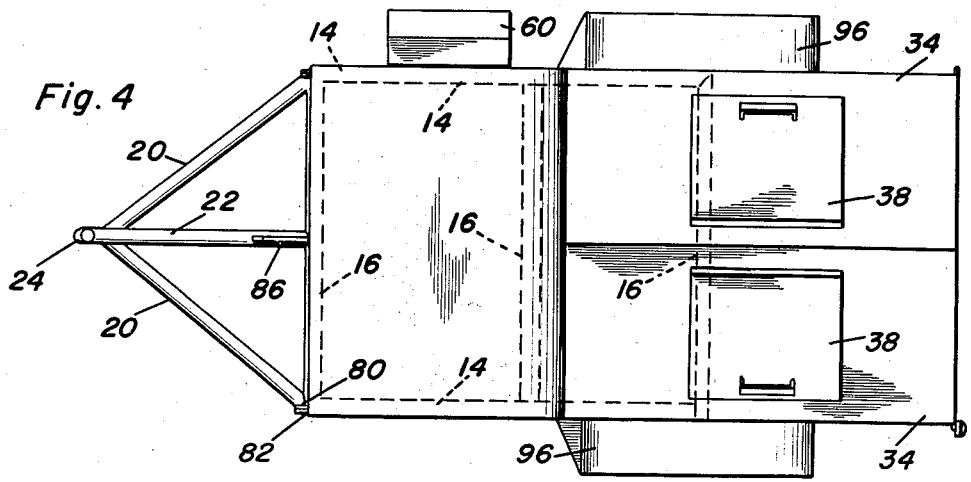

Figure 3 is a longitudinal, vertical sectional view taken substantially along a plane passing along section line 3—3 of Figure 1 showing the details of construction of the interior of the incinerator of the present invention; and Figure 4 is a top plan view of the incinerator of the present invention showing the outline of the frame in phantom together with the structural relationships of the various components of the device.

Referring now specifically to the drawings, it will be seen that the numeral 10 generally designates the incinerator of the present invention as illustrated in the accompanying drawings, including a supporting frame 12 having longitudinal members 14 and transverse members 16 with the rearmost transverse member 16 having ground engaging supporting wheels 18 at each remote end thereof. The forward transverse member 16 is rigidly secured to a pair of inwardly converging members 20, and a central longitudinal member 22 which terminates in a socket 24 having a clamp member 26 for positioning on a complemental ball (not shown) on a propelling vehicle, such as an automobile, truck or the like. The ball socket 24 may be any conventional type of trailer coupling means commercially available on the market.

As a specifically shown in Figure 3, a housing generally indicated by the numeral 28 is pivotally secured to the rearmost transverse member 16 by a pair of U-shaped brackets 30 that surround the rearmost transverse member 16 and are attached to the undersurface of the bottom 32 of the housing 28. The upper surface of the housing 28 is provided with sloping walls 34 that terminate in a crown, and each of the sloping walls 34 is provided with an opening 36 that has a removable cover 38 thereon. The cover 38 may be hingedly connected to the inner edge of the opening 36 or may be completely detachable therefrom, if desired. The housing 28 is also provided with a rear wall 40 having an enlarged opening 42 therein with an enlarged closure door 44 pivotally connected thereto by hinge means 46. The door 44 has the hinges 46 located at its upper edge wherein the door 44 will be normally closed when the bottom 32 of the housing 28 is in horizontal position. The housing 28 is also formed with a forward wall 48, thereby forming an enclosed housing, and the forward wall 48 and the top wall 34 merge into and are secured to an enlarged cylindrical fire box 50 having a depending portion 52 at its bottom wherein a grate 54 is positioned across the bottom of the fire box 50 for the passage of air into the fire box 50 and the passage of ashes downwardly onto the bottom 32 of the housing 28. One end of the cylindrical fire box 50 is provided with an opening 56 having an upwardly extending flue 58 projecting above the upper limits of the incinerator 10. The flue 58 is provided with a cover 60 and side openings 62 for discharge of smoke and other combustion gases. As illustrated, the flue 58 is polygonal and it will be understood that the flue 58 may be of any particular shape and may be provided with or without the cover 60 thereon. An enlarged opening is formed in the fire box 50 in the opposite end from the opening 56 and the opening is provided with an enlarged closure door 64 that is hinged to one edge by hinges 66 and retained in closed position by the catch 68. The closure door 64 provides access into the interior of the fire box 50 wherein inflammable trash may be positioned therein for burning. Positioned in the side wall of the housing 28 in spaced relation to the door 64 and positioned below the grate 54 is a smaller door 70 having a plurality of slots 72 therein and pivotally attached to the housing 28 by hinge means 74 and retained in closed position by a latch 76 wherein air is admitted into the interior of the housing 28, thereby supplying air into the fire box 50 through the grate 54 in the usual manner.

The frame 12 adjacent the juncture between the forwardly converging members 20 and the longitudinal members 14 is provided with upstanding lugs 78 and the forward edge of the housing 28 is also provided with projecting lugs 80 for matching the lugs 78 wherein a fastener may be inserted through aligned apertures 82 for securing the housing 28 in overlying relation to the frame 12. An upstanding lug 84 is secured adjacent the rear of the longitudinal member 22 for pivotally attaching an elongated jack bar 86 having the usual ratchet teeth thereon. A ratchet member 88 is slidably movable on the jack bar 86 and is pivotally attached to a lug 90 secured to the forward wall 48 of the housing 28. The ratchet mechanism 88 is provided with a handle 92 wherein the usual jack operating handle may be positioned thereon for raising the ratchet mechanism 88 along the jack bar 86 for pivoting the forward end of the housing 28 upwardly about the axis formed by the rearmost transverse member 16, substantially as indicated in Figure 3. The jack bar 86 and ratchet mechanism 88 may be any well known and commercially available lifting jack, such as a bumper type jack. Also, it will be seen that a prop member 94 is provided under the central portion of the forward transverse member 16 for supporting the trailer or incinerator 10 when in unhitched position. The prop 94 may be either hingedly connected to the frame 12 or may be shorter than the normal distance from the trailer hitch to the ground inasmuch as the construction of the present invention permits easy lifting of the forward end of the incinerator 10. The housing 28 is also provided with fenders 96 positioned over the ground engaging wheels 18 in order to prevent flying stones and mud during the operation of the device. Suitable stop lights and warning lights 98 with the usual electrical conductors 100 connected thereto are provided on the rear wall 40 of the housing 28 along with a suitable license plate 102. An operating handle 104 may be provided on one side of the closure door 44, if desired, and also, suitable lugs 106 may be provided in order to securely lock the door 44 in closed position.

In operation, the portable incinerator 10 is pulled behind a suitable vehicle, and the inflammable trash is positioned in the fire box 50 through the door 64 wherein the trash is burned and the combustion gases are discharged upwardly through the flue 58 and the ashes are discharged through the grate 54 onto the bottom 32 of the housing 28. The grate 54 together with the draft door 70 permits entrance of combustion air into the fire box 50, thereby supporting combustion therein and assuring that the discharge of the combustion gases will be relatively clean and smokeless. The unburnable trash, such as tin cans and the like, is positioned in the rear portion of the housing 28 through the doors 38 and after the trash has been collected or the housing 28 becomes full, the incinerator 10 is pulled to a desired location, such as a dump or the like, and the rear door is unfastened and the ratchet mechanism 88 is actuated, thereby raising the front end of the incinerator 10 for dumping the trash from the rear portion of the housing 28 and also dumping the ashes that are deposited beneath the grate 54, thereby completely emptying the housing 28 and readying the device for a repeat operation. Obviously, the device may be constructed of readily obtainable materials, thereby enhancing the economic feasibility of the device.

From the foregoing, the construction and operation of the invention will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A trailer for articulate connection with a towing vehicle comprising a support frame, hitch means on the front end of the frame for detachable articulate attachment to a towing vehicle, support wheels mounted adjacent the rear end of said frame, an enlarged hollow housing supported on said frame, means pivotally interconnecting the frame and housing for pivotal movement of the housing from a horizontal position to an inclined dumping position, said interconnecting means being disposed adjacent the rear end of the frame, lift means interconnecting the front end of the housing and the frame for raising and lowering the front end of the housing thereby moving the housing to and from the dumping position, releasable means interconnecting the front end of the housing with the frame in spaced relation to the lift means for releasably locking the housing in horizontal position, said housing having an enlarged opening in the rear end wall for discharging material therefrom when the housing is moved to a dumping position, a closure door for said enlarged opening, means hingedly connecting the upper edge of the door to the upper edge of the opening for movement about a transverse axis, the top wall of said housing having access means therein for receiving unburnable trash into the interior area thereof, a firebox supported in spaced relation to the bottom of the housing at the front end thereof whereby the bottom and forward interior area of the housing forms an ash pit for the firebox, a chimney mounted on a side wall of the housing in communication with the firebox for exhausting combustion products therefrom, access means for the firebox for receiving burnable trash, said firebox having a grate forming the bottom of the firebox whereby ashes may drop through the grate onto the bottom of the housing and air may pass upwardly from the housing for supporting combustion in the firebox, and air inlet means in the housing below the grate and adjacent thereto for admitting air into the housing for supporting combustion within the firebox, the bottom of the housing being continuous and provided with a smooth inner surface whereby ashes and unburnable trash may be simultaneously discharged from the enlarged opening in the rear end of the housing when the front end of the housing is elevated.

2. The combination of claim 1 wherein the means pivotally interconnecting the frame and housing is disposed intermediate the front and rear end of the housing with the distance between the rear end of the housing and the pivotal interconnecting means being greater than one-half of the distance between the front end of the housing and the pivotal interconnecting means whereby swinging movement of the front end of the housing will cause swinging movement of the rear end in an opposite direction thereby reducing to a minimum the upper limit of movement of the front end of the housing necessary for causing sliding of the material out of the rear end of the housing.

References Cited in the file of this patent

UNITED STATES PATENTS

| | | |
|---|---|---|
| 1,009,914 | Mayer-Dinkel | Nov. 28, 1911 |
| 1,108,642 | Travis | Aug. 25, 1914 |
| 1,629,162 | Holman | May 17, 1927 |
| 2,121,514 | Waterman | June 21, 1938 |
| 2,601,657 | Brandt | June 24, 1952 |